C. A. LINDSTROM.
CLUTCH DEVICE FOR PREVENTING REVERSE ROTATION.
APPLICATION FILED SEPT. 16, 1913.
1,153,557.
Patented Sept. 14, 1915.
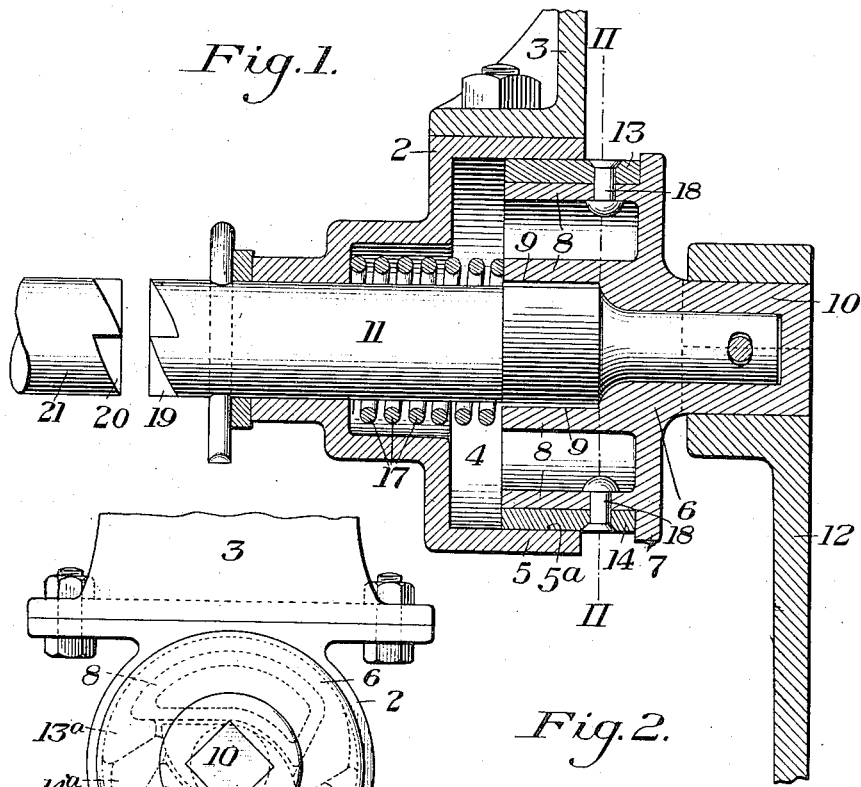
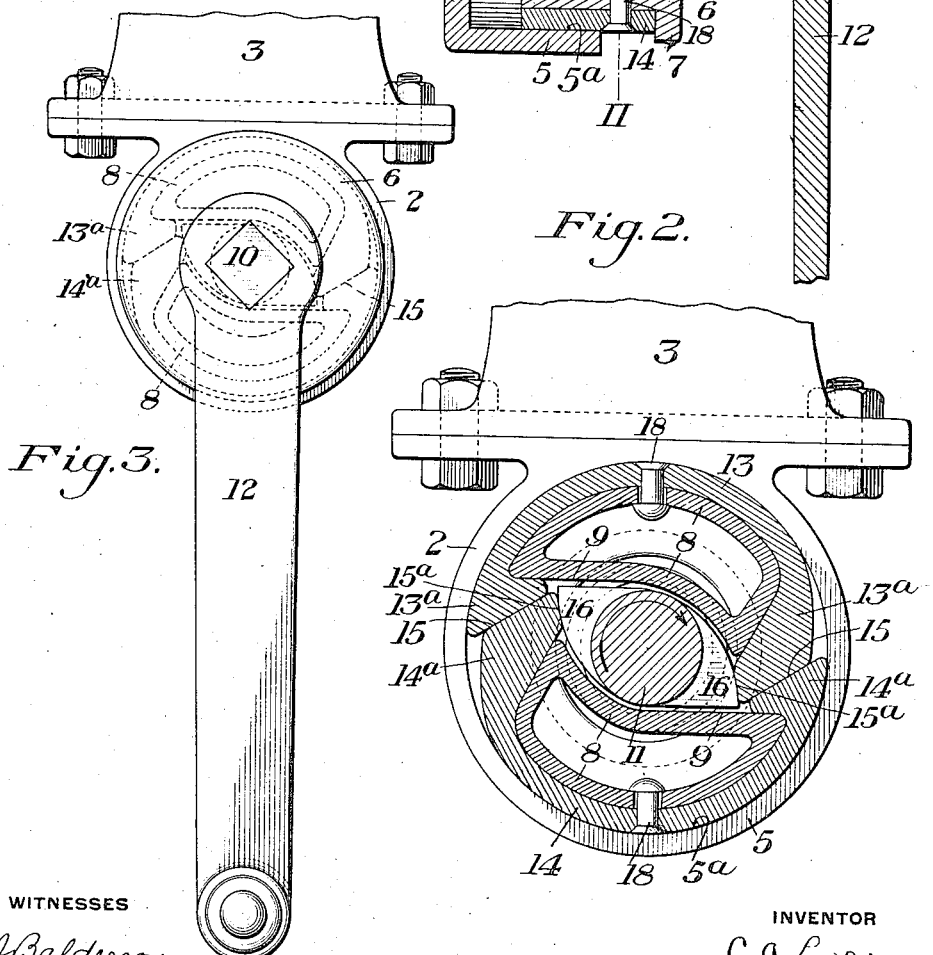
WITNESSES
INVENTOR
C. A. Lindstrom.

UNITED STATES PATENT OFFICE.

CHARLES A. LINDSTROM, OF PITTSBURGH, PENNSYLVANIA.

CLUTCH DEVICE FOR PREVENTING REVERSE ROTATION.

1,153,557.   Specification of Letters Patent.   Patented Sept. 14, 1915.

Original application filed March 6, 1913, Serial No. 752,529. Divided and this application filed September 16, 1913. Serial No. 789,995.

*To all whom it may concern:*

Be it known that I, CHARLES A. LINDSTROM, a citizen of the United States, residing at Pittsburgh, in the county of Allegheny and State of Pennsylvania, have invented a new and useful Improvement in Clutch Devices for Preventing Reverse Rotation, of which the following is a full, clear, and exact description, reference being had to the accompanying drawings, forming part of this specification, in which—

Figure 1 is a longitudinal section of one form of clutch device embodying my invention; Fig. 2 is a section on the line II—II of Fig. 1; and Fig. 3 is a front elevation.

My invention has relation to clutch devices of a character particularly designed for use where it is desired to permit a shaft or similar member to be freely rotated in one direction by a crank or other means, but which it is desired to positively hold against rotation in a reverse direction. One instance of such a device, where my invention is particularly applicable, is in connection with the cranking mechanism of automobiles. In such a device my invention provides means whereby the operator is protected against injury by "back-firing" of the engine.

The present application is, in part, a division of my pending application, Serial No. 752,529, filed March 6, 1913.

The particular nature of the invention will be best understood by reference to the accompanying drawings, in which I have shown the preferred embodiment thereof, and which will now be described, it being premised, however, that various changes may be made in the construction and arrangement of the parts, without departing from the spirit and scope of my invention as defined in the appended claims.

In the drawings, the numeral 2 designates what I call the "external" member of the clutch, which is fixed to a suitable support 3. The external member has a circular chamber 4 therein, whose outer wall 5 forms a friction surface.

6 designates what I call the "internal" member of the clutch, consisting of a disk portion 7, having two inwardly projecting segments 8, which extend within the external member, the outer surfaces of these projections being concentric with the friction surface 5 and their inner faces 9 being of irregular curved form. Said internal member also has a sleeve or hub portion 10 which is fastened to the shaft 11, and which is also fitted to receive the crank 12.

13 and 14 designate two friction members of similar form which are interposed between the segmental projections 8 and the friction surface 5. The outer surfaces 5ª of the members 13 and 14 are intended to be forced automatically into frictional contact with the surface 5 when required.

The ends of each member 13 and 14 are formed with projections 13ª and 14ª, having the contacting beveled surfaces 15 and 15ª. The friction members occupy the spaces between the exterior of the segmental projections 8 and the interior friction surface 5, the projections 13ª and 14ª fitting the ends of the projections 8 and extending inwardly between said projections. One projection 13ª and 14ª of each member 13 and 14 is adapted for engagement with the curved surface of a cam projection 16 on the shaft 11. Said shaft has two of these cam projections arranged opposite to each other, one of them engaging one projection 13ª of one member 13 and the other engaging the projection 14ª of the other member.

The shaft 11, together with the internal member, is movable longitudinally within the chamber of the external member against the action of a compression spring 17, which is seated at one end against the bearing on the external member and at the other end against the bearing on the internal member. In order to insure the endwise movement of the members 13 and 14 with the internal member, they may be connected to the segmental projections thereof by suitable means, such as the rivets 18. The inner end of the shaft 11 is formed with clutch elements 19 to engage corresponding elements 20 on the engine shaft 21.

Supposing the device to be used as the cranking mechanism of an automobile, the operation is as follows: In cranking, the internal member is pushed inwardly against the action of the compression spring 17 to cause the clutch element of the shaft 11 to engage the clutch elements of the engine shaft 21. The crank is then rotated in the direction of the arrow in Fig. 2, the internal member and the friction members 13 and 14 rotating as a unit within the external member, because the cam projections 16 do not then press against the surfaces 15ᵃ, which would cause the friction members 13 and 14 to expand, but move away from them and against the inner faces 9, thus permitting the revolving of the clutch without frictional resistance between the friction surfaces. As soon as the engine starts in the right direction, the clutch elements 20 will run ahead of the clutch elements 19 and the two members are at once separated. If the engine "back-fires" there is a tendency to turn the shaft member 11 in the reverse direction. Immediately this occurs, the cam projection 16 will act upon the ends 15ᵃ of the projections 13ᵃ and 14ᵃ of the friction members 13 and 14, to force said members outwardly into locking frictional engagement between the friction surfaces 5 and 5ᵃ. This at once locks the shaft 11 against reverse movement, thus checking the back throw of the crank and preventing injury to the operator.

Various changes may be made in the details of construction and arrangement of the various parts, without departing from the spirit and scope of the invention as defined in the appended claims.

I claim:

1. A clutch device, comprising a relatively fixed external member formed with a friction surface on its inner periphery, an internal member mounted to rotate freely in one direction within the external member and also to move longitudinally with respect thereto, radially expansible friction elements interposed between the two members to coöperate with said internal friction surface, and an endwise movable shaft to which the internal member is secured and which has means for expanding the friction elements when rotated in one direction, substantially as described.

2. A friction device, comprising a relatively fixed external member, an internal member mounted to rotate freely within said external member in one direction, and also to move longitudinally thereof, radially expansible friction devices locking the members together upon reverse rotation of the internal member, means for rotating the internal member in the free direction, and means for expanding the friction devices to prevent reverse rotation, substantially as described.

3. A friction-locking device, comprising two members arranged for relative rotation and also for relative longitudinal movement, and radially expansible friction members interposed between the two first named members and actuated by rotary movement of one of said members in one direction to lock the two members against relative rotation in that direction, said friction members being idle upon reverse relative rotation of the two members, together with spring means interposed between the two members, substantially as described.

4. A friction locking device, comprising a relatively fixed external member having an internal peripheral friction surface, an internal member, interposed friction elements between said surface and the internal member, the internal member and the friction elements being freely rotatable in one direction with respect to the external member, and means for actuating the friction elements to expand them outwardly against said internal friction surface to prevent reverse rotation of the internal member, the internal member being also capable of longitudinal movement with respect to the external member, substantially as described.

5. A device of the character described, comprising an endwise movable shaft having a clutch at one end portion and rotating means at the opposite end portion, a relatively fixed member having a friction surface, expansible friction members, movable endwise with the shaft, means for causing said friction members to rotate freely with the shaft in one direction, and means on the shaft for expanding said members outwardly against said friction surface when the shaft is rotated in the reverse direction, substantially as described.

In testimony whereof, I have hereunto set my hand.

CHARLES A. LINDSTROM.

Witnesses:
GEORGE B. BLEMING,
JESSE B. HELLER.